J. H. CARY.
LOCK NUT.
APPLICATION FILED MAY 13, 1916.
1,218,168.
Patented Mar. 6, 1917.
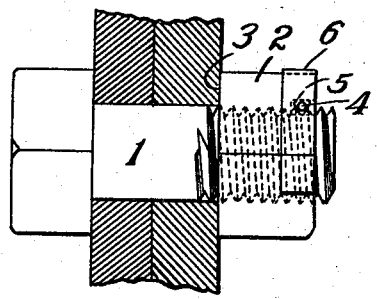
FIG. 1
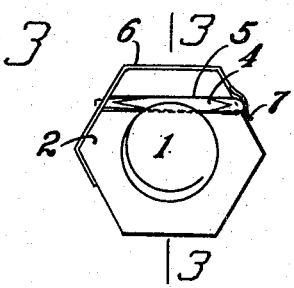
FIG. 3   FIG. 2
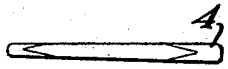
FIG. 4
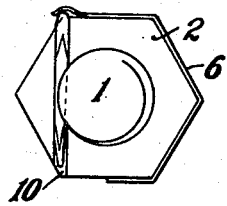
FIG. 5
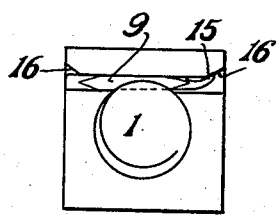
FIG. 8   FIG. 7
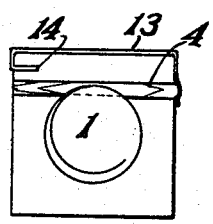
FIG. 6
INVENTOR
JAMES H. CARY
BY A. T. Palmer
ATTY.

UNITED STATES PATENT OFFICE.

JAMES H. CARY, OF BOSTON, MASSACHUSETTS, ASSIGNOR OF ONE-HALF TO WILLIAM HENRY GRIFFITH, OF NARRAGANSETT PIER, RHODE ISLAND.

LOCK-NUT.

1,218,168. Specification of Letters Patent. Patented Mar. 6, 1917.

Application filed May 13, 1916. Serial No. 97,407.

*To all whom it may concern:*

Be it known that I, JAMES H. CARY, a citizen of the United States, residing at Boston, in the county of Suffolk and State of Massachusetts, have invented a new and useful Improvement in Lock-Nuts, of which the following is a specification.

This invention relates to means for locking threaded nuts on suitably threaded bolts and has for its object the providing of a specially prepared nut adapted to engage with any properly threaded bolt of the same size.

Primarily, my invention comprises the milling of a straight slot of uniform cross-section across the face of the nut and tangential to the thread, and the providing of a tapered pin adapted to occupy this groove and engage the thread of the bolt without mutilating it; combined with elastic means for yieldingly holding the pin in place.

This provides a means for preventing the unscrewing of the nut when once locked upon the bolt but permits further screwing down upon the shoulder of the work, if any wear of said shoulder should cause any looseness in the joint, without removing the pin from the slot. As any further tightening of the nut, as above, tends to loosen the elastic pin in the groove, I provide the elastic means to yieldingly hold the pin, firmly against the thread as regards unscrewing but yieldingly as regards further screwing. By reversing the arrangement, the nut may be similarly held against unscrewing but firmly against further screwing.

In the drawings which accompany and form part of this specification and which illustrate several embodiments of my invention,—

Figure 1 is a side view showing bolt and nut locked upon suitable shoulders.

Fig. 2 is an end view of Fig. 1.

Fig. 3 is an enlarged view of the pin, in section on line 3—3 of Fig. 2.

Fig. 4 is a side view of one form of pin.

Fig. 6 is a cross-section of a modified form of pin.

Figs. 5, 7 and 8 show modified forms, Fig. 7 being different from the preferred form only in the saw cut which holds the spring.

The bolt 1 is set up against the work to be clenched and nut 2 is first threaded against shoulder 3. In the case of a right-hand thread, the pin 4 is then inserted in the groove 5 in the direction opposite to the movements of the hands of a clock, the hooded end 7 of the spring 6 being sprung outward to permit its entrance, whereafter this end 7 engages the large end of pin 4 to yieldingly hold it in place. Any effort to unscrew nut 2 after pin 4 is in place serves to tighten the lock, by reason of the taper of the pin. Should the strain of use induce sufficient wear of shoulder 3 to cause any looseness of nut 2, a simple turn of the wrench, without removing pin 4, is all that is required, the spring 6 retaining pin 4 in place.

In Fig. 2, the small end of pin 4 is shown as projecting slightly through a hole in spring 6, although this form of construction is not essential. By making slot 5 of uniform cross-section throughout, pin 4 can be inserted from the opposite side, with spring 6 reversed, when the nut is turned with the slotted face against the work. This reversible feature is of value.

In Fig. 5, the groove 10 is shown in changed position but still of uniform cross-section.

In Fig. 7, spring 13 is so shaped as to permit a turned end 14 to be locked in a small saw-cut in the nut.

In Fig. 8, the elastic means of retention are provided by a bent and somewhat attenuated tip 15, on pin 9, which can be forced through the slot, the tip dropping behind a shoulder formed by a slight chamfer 16 formed at one side of the groove.

By the foregoing description it will be seen that I consider the essentials of my invention to be covered by a tapered pin, a straight groove and some elastic means to retain the pin in locked position.

I do not limit myself to the precise construction shown.

What I claim is:—

1. A nut adapted to engage the threaded end of a suitable bolt and provided with a groove across one face that is tangential to the central opening and of, substantially, uniform cross-section; a tapered pin with a V-shaped edge adapted to engage the thread on said bolt, said pin being adapted to enter said groove from one end and lock said nut in one direction only, and being further adapted to enter said groove from the other end and lock said nut in the other direction only; and a reversible spring adapted to removably clasp said nut and alternately retain said pin in said groove from the entering end.

2. A nut adapted to engage the threaded end of a suitable bolt and provided with a groove across one face that is tangential to the central opening and of, substantially, uniform cross-section; a tapered pin with a V-shaped edge adapted to engage the thread on said bolt, said pin being adapted to enter said groove from one end and lock said nut in one direction only, and being further adapted to enter said groove from the other end and lock said nut in the other direction only; and reversible means for elastically retaining said pin in said groove.

JAMES H. CARY.